United States Patent [19]

Evans et al.

[11] 4,331,733

[45] May 25, 1982

[54] FLAME-RETARDANT POLYOLEFIN COMPOSITIONS, THEIR METHOD OF PREPARATION AND INSULATED ELECTRICAL CONDUCTORS MANUFACTURED THEREWITH

[75] Inventors: Edwin R. Evans, Clifton Park; Jerry D. Florence, Slingerlands, both of N.Y.

[73] Assignee: General Electric Company, Waterford, N.Y.

[21] Appl. No.: 214,915

[22] Filed: Dec. 10, 1980

[51] Int. Cl.³ .............................................. B32B 15/08

[52] U.S. Cl. .................................... 428/379; 428/391; 525/88; 525/93; 524/506; 524/430; 524/437; 524/505

[58] Field of Search ................. 260/42.26; 525/88, 93; 428/379, 391

[56] References Cited

U.S. PATENT DOCUMENTS

| | | | |
|---|---|---|---|
| 3,979,356 | 9/1976 | Walters | 260/42.26 |
| 4,123,586 | 10/1978 | Betts et al. | 428/391 |
| 4,153,752 | 5/1979 | MacKenzie et al. | 428/379 |
| 4,273,691 | 6/1981 | MacLaury et al. | 428/391 |

*Primary Examiner*—Lewis T. Jacobs

[57] ABSTRACT

Curable polymeric compositions comprising copolymers of alpha-substituted polyolefins and silarylenesiloxane-polydiorganosiloxane block copolymers which exhibit increased resistance to flow and dripping at flame temperatures. The compositions are made by blending the polyolefin with a silphenylene and optionally a filler and can be used when cured as flame-retardant insulation for wire and cable and for molded products and the like.

44 Claims, 1 Drawing Figure

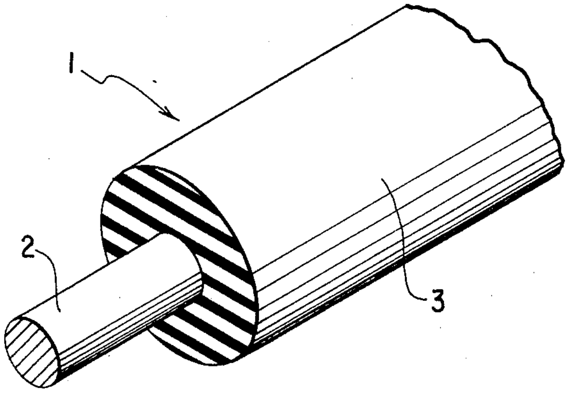
1
2
3

FLAME-RETARDANT POLYOLEFIN COMPOSITIONS, THEIR METHOD OF PREPARATION AND INSULATED ELECTRICAL CONDUCTORS MANUFACTURED THEREWITH

The present invention relates to novel flame-retardant polymeric compositions, a method of making such compositions and insulated electrical conductors manufactured therewith, and more particularly, to compositions of alpha-substituted polyolefins and silarylenesiloxane-polydiorganosiloxane block copolymers and a method of making such compositions which result in materials that resist loss of physical form and structural integrity when exposed to either flame or combustion temperatures.

BACKGROUND OF THE INVENTION

Organic polymeric compositions such as polyolefins, which are commonly utilized as dielectric insulating materials for electrical wires and other conductors, comprise materials which are typically highly susceptible to a loss of physical form and/or structural integrity when subjected to flame or combustion temperatures. The loss of physical form and/or structural integrity in these polymeric compositions at the temperatures of flame or burning conditions is normally accompanied by the flow and dripping of their combustible components which can be an especially hazardous source of material for the spreading flame.

As used in the claims and through this specification, the terms "flame temperatures" or "combustion temperatures" are to be understood to mean the temperature conditions at which oxidation takes place so rapidly that the products thereof are rendered incandescent. The terms "silphenylene" and "silarylenesiloxane-polydiorganosiloxane copolymers" are herein used interchangeably.

Flame propagation due to flowing and dripping of combustible organic electrical insulating materials is particularly critical in locations within and about motors and machinery because of the general presence or close proximity of oils and other highly combustible lubricants and other materials which can, in turn, further propagate and expand the fire hazard and its spread. Furthermore, where electrical or electronic components are present, circuit integrity can be impaired by the dripping or flowing of combustible organic insulation materials and by the consequential spread of flame and fire.

Previously, most of the methods of imparting flame-retardancy to polymeric compositions involved adding highly halogenated compounds to the polymer. This practice not only produced a polymer which was very corrosive to some materials it may have come into contact with but also produced a polymer which could give off toxic gases when exposed to flame or combustion temperatures.

SUMMARY OF THE INVENTION

The primary object of this invention is to provide a polymeric composition having a high degree of resistance to flow and dripping at flame or combustion temperatures.

Another object of this invention is to provide a polymeric composition which forms a nonflowing, drip-free, fire-resistant barrier layer on its surface when exposed to flame or combustion temperatures, thereby resisting flowing and dripping and in addition to insulate the underlying polymeric composition.

Another object of the present invention is to provide a process for the preparation of compositions of alpha-substituted polyolefins and silarylenesiloxane-polydiorganosiloxane block copolymers (or silphenylene) to produce thermally curable extrudable mixtures having a high degree of resistance to flow and dripping at flame or combustion temperatures.

Another object of this invention is to provide a process capable of producing a halogen-free alpha-substituted polyolefin composition with a high degree of resistance to flow and dripping at flame or combustion temperatures.

Another object of this invention is to provide electrical wire or cable and other electrical conductors insulated with a novel polyolefin composition of improved high temperature properties to reduce the hazard of fires and their propagation when such conductors are exposed to flame or combustion temperatures.

These and other objects are accomplished by adding to alpha-substituted polyolefin compositions before curing: (a) between about one percent and about 30 percent by weight of said polyolefin of a silarylenesiloxane-polydiorganosiloxane block copolymer (a silphenylene); (b) a curing agent or cross-linking agent to enable curing of the mixture of said alpha-substituted polyolefin composition and the silphenylene copolymer; (c) from 0 to about 150 percent by weight of the polyolefin of a filler; and (d) up to about 2 percent by weight of the polyolefin of a coagent or coagents to improve the modulus and to increase the rate of cure and the cross-linked density of the composition.

In accordance with the present invention, there is disclosed an improved flame-retardant alpha-substituted polyolefin composition comprising an alpha-substituted polyolefin in admixture with from about one percent to about 30 percent based on the weight of the polyolefin, of a silarylenesiloxane-polydiorganosiloxane block copolymer, and from zero percent to about 150 percent based on the weight of the polyolefin of a filler.

The above-described methods and compositions impart flame-retardancy of alpha-substituted polyolefins by providing for the formation of a layer of char when exposed to combustion temperatures which prevents flow and dripping and thermally insulates the underlying composition from the combustion temperatures.

Also disclosed is an electrical conductor having a dielectric polymeric insulation resistant to flow and dripping at flame temperatures, comprising a metal conductor insulated with a cross-linked cured polymeric composition comprising: 100 parts of an alpha-substituted polyolefin composition, from about 1 to about 30 parts of a silarylenesiloxane-polydiorganosiloxane block copolymer, up to about 150 parts of a filler, and up to about 2 parts of a coagent or coagents.

Further objects of the invention together with additional features and advantages thereof will become readily apparent to those skilled in the art in view of the following detailed description.

BRIEF DESCRIPTION OF THE DRAWING

The drawing comprises a perspective view illustrating an insulated conductor product according to this invention.

DETAILED DESCRIPTION OF A PREFERRED EMBODIMENT

The present invention comprises new curable polymeric compositions composed of ingredients which provide distinctive and advantageous properties, a method for producing such polymeric compositions and electrical conductors coated with cured forms of such polymeric compositions as insulation.

The cured polyolefin compositions, containing specified silarylenesiloxane-polydiorganosiloxane block copolymers in accordance with the present invention, have physical properties which are ideal for electrical insulation for electrical wire and cable and other conductors, or for molded goods and which exhibit a high degree of resistance to a loss of physical integrity or to flow and dripping at flame or combustion temperatures. The curable polymeric compositions of this invention comprise blends or combinations of an alpha-substituted polyolefin material, a silarylenesiloxane-polydiorganosiloxane block copolymer and, optionally, a conventional filler and coagent or coagents. The alpha-substituted polyolefin compositions of this invention are cross-linked or cured to a thermoset state by means of a conventional free radical forming catalysts, for example, an organic peroxide catalyst.

The polymeric compositions of this invention comprise an alpha-substituted polyolefin, a silarylenesiloxane-polydiorganosiloxane block copolymer and a filler, in the following relative proportions in parts by weight, based upon the weight of the polyolefin:

| | Approximate Proportions | |
|---|---|---|
| Ingredients | Broad | Preferred |
| Alpha-Substituted Polyolefin | 100 | 100 |
| Filler | 0–150 | 25–125 |
| Silarylenesiloxane-polydiorganosiloxane block copolymer (silphenylene) | 1–30 | 5–25 |
| Peroxide Curing Agent | 1–10 | 2–5 |

The polymeric compositions for use in this invention can be alpha-substituted polyolefin compositions such as alpha-substituted polyethylene, for example, polyvinyl chloride, polyvinyl acetate, and styrene; alpha-substituted polypropylene, for example, vinyl propylene, acrylonitrile, and acrylates; polybutenes; and polyisoprenes.

As mentioned above, a conventional filler can be used in the invention; for example, the filler can be hydrated alumina, aluminum oxide, titanium dioxide, carbon black or fume silica. Particle size and form of the filler are not critical but in preferred embodiments the filler has a relatively fine particle size of from about 0.1 micron to about 1 micron.

Silarylenesiloxane-polydiorganosiloxane block copolymers suitable for use as flame-retardant additives in the polymeric composition of this invention are block copolymers made up of units of silarylenesiloxane having the general formula:

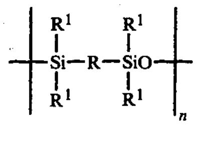

and units of diorganopolysiloxane of the general formula:

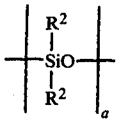

where n is an integer equal to from 1 to about 100, preferably an average of about 2 to about 50, R is a divalent aromatic organic radical, $R^1$ is a monovalent organic radical, a is an integer equal to from about 5 to about 10,000 inclusive, preferably an average of about 10 to about 1000, and $R^2$ is an organic radical selected from the group consisting of monovalent hydrocarbon radicals, unsaturated aliphatic radicals and halogenated radicals. In the foregoing general formulas, R includes, for example, divalent aromatic hydrocarbon radicals such as phenylene, tolylene, xylylene, naphthalene, 4,4′-biphenylene, 4,4′-diphenylene ether, and the like; and halogenated divalent aromatic hydrocarbon radicals such as chlorophenylene, bromonaphthalene, and the like. The monovalent organic radicals $R^1$ include, for example, alkyl radicals such as methyl, ethyl and propyl; aryl radicals such as phenyl and naphthyl alkaryl radicals such as tolyl and xylyl; unsaturated aliphatic radicals such as vinyl, allyl, propenyl; and halogenated radicals such as chlorophenyl and 3,3,3-trifluoropropyl. R and $R^1$ can be more than one radical, respectively, and these radicals can be the same or different as previously defined. Thus, for example, R can be methyl radical and $R^1$ can be a combination of ethyl and methyl radicals, or R can be a butyl radical and $R^1$ can be methyl and n-propyl, and the like.

Examples of radicals embraced by $R^3$ for the silanol-terminated polydiorganosiloxane are organic radicals having from about 1 to about 13 carbon atoms and include straight chain and/or branched chain monovalent hydrocarbon radicals, for example, alkyl radicals such as methyl, ethyl, propyl, butyl, isobutyl, isopropyl, heptyl, stearyl, and the like, or for example, aryl radicals, such as phenyl, tolyl, xylyl, and the like.

Preferred silphenylene copolymers have inherent viscosities of from about 1 to about 2 dl/g at 0.5 g/dl in toluene at 25° C.

The preferred silphenylene block copolymers contain copolymeric molecules consisting essentially of (a) amorphous segments consisting of linked repeating units of the formula $(R^2)_2SiO$ having an average minimum number of at least 10 units of $(R^2)_2SiO$ and (b) crystallite segments consisting of linked repeating units of the formula $—Si(R^1)_2—R—(R^1)_2SiO—$ having an average minimum number of at least 3 units of $—Si(R^1)_2—R—(R^1)_2SiO—$, where each $R^2$ is a monovalent alkyl radical or halogenated monovalent alkyl radical having from about 1 to about 8 carbon atoms, each $R^1$ is a monovalent organic radical and R is a divalent aromatic radical, the molar ratio of total $(R^2)_2SiO$ units to total $—Si(R^1)_2—R—(R^1)_2SiO—$ units ranging from about 10:90 to about 95:5.

The silarylenesiloxane-polydiorganosiloxane block copolymers can be blended directly with the polyolefin, such as polyvinyl chloride, or added in the form of a masterbatch with a filler such as hydrated alumina to facilitate dispersion. The compositions are suitably cross-linked, by free radical catalysts including, for example, commercial peroxides such as dicumyl peroxide which is added last to the blended compositions to preclude scorching or premature curing.

The polyolefin compositions of this invention are cross-linked or cured to a thermoset state by adding a curing agent and heating the blend to its curing temperature. Curing temperatures range from about 149° C. to about 218° C. preferably from about 163° C. to about 188° C. Effectively usable curing agents comprise those materials which will affect a cross-linking cure of the olefin, such as organic peroxides which decompose to provide free radicals upon exposure to increased temperatures. Tertiary organic peroxides such as diacumyl peroxide are preferred because their temperature levels for decomposition and incitement of the cross-linking curing are in a practical range for most manufacturing operations. Suitable peroxide curing systems for the polyolefin compositions of this invention are further described in U.S. Pat. Nos. 2,888,424; 3,079,370; 3,086,966; and 3,214,422. Specific tertiary diperoxides include 2,5-dimethyl-2,5(t-butyl peroxy) hexane; 2,5-dimethyl-2,5(t-butyl peroxy) hexyne-3; d,α-bis(t-butyl peroxy) diisopropyl benzene; and similar diperoxy compounds.

The ratio of peroxide curing agent to the polyolefin material depends on the physical and chemical properties desired in the cured product, such as the degree of solvent resistance or hot tensile strength. Amounts of peroxide curing agent of from about 0.25 percent to about 10 percent by weight of the polyolefin satisfy most requirements, and typically proportions of about 0.5 percent to about 1.5 percent based upon the weight of the polyolefin suffice for compositions for most applications.

The polyolefin compositions of this invention can include other ingredients, additives and coagents, depending upon the intended service of the products thereof and the required or desired properties. These coagents or additives may be added at any point in the mixing procedure before curing or as a masterbatch with one of the other ingredients. For example, other components may comprise antioxidants, preservatives, lubricants, mold release agents, pigments or coloring agents, inorganic fillers, processing aids, waterproofing agents, coupling agents, etc. Specific coagents may be used to improve the modulus and to increase the rate of cure and cross-linked density. These coagents may be, for example, ethylene dimethacrylate, p-divinyl benzene and neopentylglycoldiacrylate. The particular ingredients and the ratios of the ingredients including the amount of curing agent, the curing time, curing temperature and various other conventional parameters can be adjusted and controlled by one skilled in the art to obtain the desired or optimum properties without undue experimentation.

In order that those skilled in the art will be better able to practice the invention, the following examples are given by way of illustration and not by way of limitation. The examples comprise preferred and typical polyolefin compositions of this invention. The proportions of the ingredients of each of the numbered example compositions are given in relative parts by weight based upon the weight of the polyvinyl chloride (PVC).

EXAMPLES

In each of the seven numbered examples in the table below relative proportions of ingredients in parts by weight along with the results obtained from a charforming test are given.

TABLE

| Ingredients | 1 | 2 | 3 | 4 | 5 | 6 | 7 |
|---|---|---|---|---|---|---|---|
| Polyvinyl Chloride | 100 | 100 | 100 | 100 | 100 | 100 | 100 |
| Hydrated Alumina | 100 | 50 | 50 | 100 | 25 | 100 | — |
| Silphenylene (methyl substituted) | — | 3 | 6 | 6 | 10 | 20 | 20 |
| Dicumylperoxide | 4.5 | 4.5 | 4.5 | 4.5 | 4.5 | 4.5 | 4.5 |
| % Char | 14 | 17 | 20 | 20 | 20 | 31 | 35 |

100 parts of polyvinyl chloride was banded on a steam heated 32.38 cm.×15.24 cm mill set for a surface roll temperature of 105° C. The amount of silphenylene given in the above table for each example was then added and mixed until a homogeneous blend was obtained. Hydrated alumina in the amount designated in the table above was then added incrementally at a rate slow enough to preclude cooling of the blend and concomitant flaking of the filler. While the hydrated alumina filler was being added the temperature of the mill was raised to 120° C. After a homogeneous blend was obtained, the temperature of the mill was lowered to about 95° C. by the use of cooling water in the rolls. Finally, 4.5 parts by weight of dicumylperoxide was added and after blending the curable stock was removed from the mill.

In order to get cured material for the charforming test, about 90 grams of the compound was placed in a 15.24 cm×15.24 cm×0.19 cm mold and press-cured for 30 minutes at 163° C. The cured material was then cut into strips to fit 3.8 cm circular tared aluminum cups. The tared sample cups with the strips were then placed in a Carnahan charforming tester developed by Dr. J. C. Carnahan of the General Electric Corporate Research and Development Center, Schenectady, N.Y., and described by Dr. Michael R. MacLaury in the Journal of Fire and Flammability, Vol. 10, p. 175 (1979). The samples were subjected to radiant energy of ten watts per $cm^2$ for a period of time sufficient to bring the samples to a black body temperature of 550° C. A flame from a Bunsen Burner was then applied to the samples which were then allowed to self-extinguish. The radiant heating of the samples was continued until glowing char was no longer visible. The samples were cooled to room temperature in a desiccator. The weight of char was then determined and normalized for the amount of filler and the losses due to moisture.

The degree of resistance to flow and dripping at combustion temperature is related to the amount of protective char layer formed on the surface. The percent char values were obtained by using tared strips derived from cured 15.24 cm×15.24 cm×0.19 cm sheets which were placed in a Canahan charforming tester. The resulting samples using the compositions given above provided a char level of from 17 percent to 31 percent which was dependent upon the amount of silarylenesiloxane-polydiorganosiloxane copolymer utilized. The addition of the silarylenesiloxane-polydiorganosiloxane copolymer alone to the polyvinyl chloride composition without a filler, sample 7, resulted in a 35 percent level of char being formed. The polyvinyl chloride samples containing both silarylenesiloxane-polydiorganosiloxane block copolymer and the alumina filler, samples 2–7, also demonstrated a higher degree of retention of sample integrity with resistance to flow and drip, while the control, sample 1, did not.

A typical electrical conductor product insulated with the polyolefin composition of this invention is illustrated in the drawing. Referring to the drawing, insulated electrical conductor 1, comprises a metallic conductor 2, for example, copper composed of a single strand as shown or a bundle of individual strands (not shown), having an electrically insulating coating or covering 3 of an alpha-substituted cured polyolefin composition incorporating a silphenylene block copolymer according to the present invention and which is resistant to flow and dripping at flame temperatures.

It is to be understood that although a single insulating coating is shown, the compositions of this invention may comprise an overcoating or overcoatings in multilayered insulation.

Although the invention has been described with reference to certain specific embodiments thereof, numerous modifications are possible without departing from the present invention as herein disclosed, and it is desired to cover all modifications falling within the spirit and scope of the invention.

What is claimed is:

1. A curable polyolefin composition blend comprising an alpha-substituted polyolefin, about 1 to about 30 percent of a silarylenesiloxane-polydiorganosiloxane block copolymer and from zero to about 150 percent of a filler based on the weight of the polyolefin.

2. The curable polyolefin composition of claim 1, wherein the block copolymer comprises blocks having an average minimum of at least 10 units of linked repeating units of the formula $(R^2)_2SiO$ and blocks having an average minimum of at least 3 units of linked repeating units of the formula $Si(R^1)_2—R—(R^1)_2SiO$ where each $R^2$ is selected from the group consisting of monovalent organic radicals and halogenated monovalent organic radicals, each $R^1$ is a monovalent hydrocarbon radical and R is a divalent aromatic radical.

3. The curable polyolefin composition of claim 1, wherein said filler is selected from the group consisting of hydrated alumina, aluminum oxide, titanium dioxide, carbon black and fume silica.

4. The composition of claim 1, further comprising up to about 2 percent based on the weight of the polyolefin of a coagent to improve the modulus and to increase the cross-linked density of said composition.

5. The composition of claim 4, wherein the coagent is selected from the group consisting of ethylene dimethacrylate, p-divinyl benzene, and neopentylglycoldiacrylate.

6. The composition of claim 1, wherein the alpha-substituted polyolefin is an alpha-substituted polyethylene.

7. The composition of claim 1, wherein the alpha-substituted polyolefin is selected from the group consisting of polyvinyl chloride, polyvinyl acetate and styrene.

8. The composition of claim 1, wherein the silarylenesiloxane-polydiorganosiloxane block copolymer is made up of units of silarylenesiloxane having the general formula:

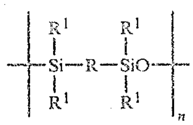

and diorganopolysiloxane of the general formula:

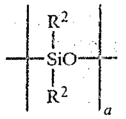

wherein n is an integer equal to 1 to about 100, R is a divalent aromatic organic radical, $R^1$ is a monovalent organic radical, a is an integer equal to from about 5 to about 10,000 inclusive, and $R^2$ is an organic radical selected from the group consisting of monovalent hydrocarbon radicals, unsaturated aliphatic radicals and halogenated radicals.

9. The composition of claim 8, wherein $R^2$ is selected from the group consisting of methyl radicals, ethyl radicals, and combinations of methyl and ethyl radicals.

10. The composition of claims 8 or 9, wherein R is a phenylene radical and $R^1$ is a methyl radical.

11. The composition of claim 8, wherein a has a value of about 26 and n has a value from about 4 to about 6.

12. The composition of claim 1, wherein the filler is present in amounts from about 25 percent to about 100 percent based on the weight of the polyolefin.

13. The curable polyolefin composition of claim 1, wherein the composition is halogen-free.

14. The cured composition of claim 1.

15. An article of manufacture comprising the cured product of the composition of claim 1.

16. A method for preparing a cured polyolefin composition which comprises:

(A) Blending (1) an alpha-substituted polyolefin resin;

(2) from about 1 to about 30 weight percent based on the weight of the polyolefin of a silarylenesiloxane-polydiorganosiloxane block copolymer made up of units of silarylenesiloxane having the general formula:

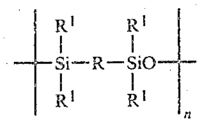

and diorganopolysiloxane of the general formula:

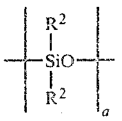

wherein n is an integer equal to 1 to about 100, R is a divalent aromatic organic radical, $R^1$ is a monovalent organic radical, a is an integer equal to from about 5 to about 10,000 inclusive, and $R^2$ is an organic radical selected from the group consisting of monovalent hydrocarbon radicals, unsaturated aliphatic radicals and halogenated radicals;

(3) a sufficient amount of an organotertiary peroxide curing agent; and (4) from zero to about 150 percent by weight of the polyolefin of a filler;

and (B) heating the resultant composition sufficiently to affect curing thereof.

17. The method of claim 16, wherein the peroxide curing agent is present in an amount from about 1 to about 10 percent by weight of the polyolefin.

18. The method for preparing the cured polyolefin composition of claim 16, further comprising adding to said composition up to about 2 percent by weight of said polyolefin, of a coagent to improve the modulus and to increase the rate of cure and cross-linked density of said composition.

19. The method of claim 18, wherein said coagent is selected from the group consisting of ethylene dimethyacrylate, p-divinyl benzene, and neopentylglycoldiacrylate.

20. The method of claim 16, wherein the silarylenesiloxane-polydiorganosiloxane copolymer has an inherent viscosity of from about 1 to about 2 dl/g at 0.5 g/dl in toluene at 25° C.

21. The method of claims 16 or 18, wherein the polyolefin is an alpha-substituted polyethylene.

22. The method of claims 16 or 18, wherein the polyolefin is selected from the group consisting of polyvinyl chloride, styrene and polyvinyl acetate.

23. The method of claims 16 or 18, wherein a has an average of between 10 and 1,000 inclusive.

24. The method of claims 16 or 18, wherein $R^2$ is selected from the group consisting of a methyl radical, an ethyl radical, and a combination of methyl and ethyl radicals.

25. The method of claims 16 or 18, wherein R is a phenylene radical and $R^1$ is a methyl radical.

26. The method of claims 16 or 18, wherein a has a value of about 26 and n has a value from about 4 to about 6.

27. The method of claims 16 or 18, wherein said peroxide curing agent is selected from the group consisting of dicumylperoxide and a,a'-bis(t-butylperoxy)di-isopropylbenzene.

28. The method of claims 16 or 18, wherein the composition is cured at a temperature of from about 149° C. to about 218° C.

29. The method of claims 16 or 18, wherein the composition is cured at a temperature of from about 163° C. to about 188° C.

30. The method of claims 16 or 18, wherein said filler is selected from the group consisting of hydrated alumina, aluminum oxide, titanium dioxide, carbon black and fume silica.

31. The method of claims 16 or 18, wherein the filler is present in an amount from about 25 percent to about 100 percent by weight of the polyolefin.

32. The method of claims 16 or 18, wherein said block copolymer contains copolymeric molecules comprising:

(a) amorphous segments consisting of linked repeating units of the formula $—(R^2)_2SiO—$ having an average minimum number of at least 10 units of $—(R^2)_2SiO—$; and (b) crystallite segments consisting of linked repeating units of the formula $—Si(R^1)_2—R—(R^1)_2SiO—$ having an average minimum number of at least 3 units of $—Si(R^1)_2—R—(R^1)_2SiO—$, where each $R^2$ is a monovalent alkyl radical, each containing from 1 to about 8 carbon atoms, $R^1$ is a monovalent organic radical, and R is a divalent aromatic radical, the molar ratio of total $—(R^2)_2SiO—$ units to total $—Si(R^1)_2—R—(R^1)_2SiO—$ units ranging from about 10:90 to about 95:5.

33. An insulated electrical conductor comprising a metal electrical conductor coated with a cross-linked cured polymeric composition blend comprising 100 parts of an alpha-substituted polyolefin composition and from about 2 to about 30 parts of a silarylenesiloxane-polydiorganosiloxane block copolymer and from 0 to about 150 parts of a filler.

34. An insulated electrical conductor according to claim 33, wherein said filler in said blend is selected from the group consisting of hydrated alumina, aluminum oxide, titanium dioxide, carbon black and fume silica.

35. An insulated electrical conductor according to claim 33, wherein the alpha-substituted polyolefin is an alpha-substituted polyethylene.

36. The insulated electrical conductor according to claim 33, wherein the polyolefin composition is selected from the group consisting of polyvinyl chloride, polyvinyl acetate and styrene.

37. The insulated electrical conductor according to claim 33, wherein the silarylenesiloxane-polydiorganosiloxane block copolymer comprises blocks having an average minimum of at least 10 units of linked repeating units of the formula $(R^1)_2SiO$ and blocks having an average minimum of at least 3 units of linked repeating units of the formula $Si(R^1)_2—R—(R^1)_2SiO$ where each $R^2$ is selected from the group consisting of monovalent organic radicals and halogenated monovalent organic radicals, each $R^1$ is a monovalent hydrocarbon and R is a divalent aromatic radical.

38. The insulated electrical conductor according to claim 33, further comprising up to about 3 percent based on the weight of the polyolefin of a coagent effective for improving the modulus and increasing the cross-linked density of said composition.

39. The conductor of claim 38, wherein the coagent is selected from the group consisting of ethylene dimethacrylate, p-divinyl benzene, and neopentylglycoldiacrylate.

40. The conductor of claim 33, wherein the silarylenesiloxane-polydiorganosiloxane block copolymer is made up of units of silarylenesiloxane having the general formula:

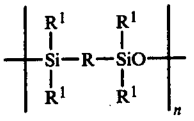

and diorganopolysiloxane of the general formula:

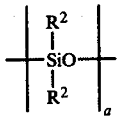

wherein n is an integer equal to 1 to about 100, R is a divalent aromatic organic radical, $R^1$ is a monovalent organic radical, a is an integer equal to from about 5 to about 10,000 inclusive, and $R^2$ is an organic radical selected from the group consisting of monovalent hydrocarbon radicals, unsaturated aliphatic radicals and halogenated radicals.

41. The conductor of claim 40, wherein $R^2$ is selected from the group consisting of methyl radicals, ethyl radicals, and combinations of methyl and ethyl radicals.

42. The conductor of claims 40 or 41, wherein R is a phenylene radical and $R^1$ is a methyl radical.

43. The conductor of claim 40, wherein a has a value of about 26 and n has a value from about 4 to about 6.

44. The conductor of claim 33, wherein the filler is included at a concentration of from about 25 percent to about 100 percent based on the weight of the polyolefin.

* * * * *